(12) United States Patent
Takeda et al.

(10) Patent No.: US 7,872,826 B2
(45) Date of Patent: Jan. 18, 2011

(54) DISK STORAGE DEVICE AND CONTROL METHOD FOR THE SAME

(75) Inventors: Sumie Takeda, Kanagawa (JP);
Katsumoto Onoyama, Kanagawa (JP);
Yosuke Hamada, Kanagawa (JP);
Hiroyuki Oosawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 772 days.

(21) Appl. No.: 11/588,863

(22) Filed: Oct. 27, 2006

(65) Prior Publication Data

US 2007/0153412 A1  Jul. 5, 2007

(30) Foreign Application Priority Data

Oct. 27, 2005  (JP) ............................. 2005-312446

(51) Int. Cl.
*G11B 19/02* (2006.01)
*G11B 15/04* (2006.01)

(52) U.S. Cl. .......................................... 360/69; 360/60
(58) Field of Classification Search ....................... None
See application file for complete search history.

(56) References Cited

U.S. PATENT DOCUMENTS

| 5,566,077 | A | * | 10/1996 | Kulakowski et al. | ........ 700/299 |
|---|---|---|---|---|---|
| 5,777,815 | A | * | 7/1998 | Kasiraj et al. | ................. 360/75 |
| 6,226,140 | B1 | * | 5/2001 | Serrano et al. | ................ 360/60 |
| 6,369,973 | B1 | | 4/2002 | Mushika et al. | |
| 6,882,489 | B1 | * | 4/2005 | Brunnett et al. | ............... 360/60 |
| 6,898,046 | B2 | * | 5/2005 | Sri-Jayantha et al. | .... 360/77.02 |
| 7,423,832 | B2 | * | 9/2008 | Buch et al. | ..................... 360/75 |
| 2003/0223143 | A1 | | 12/2003 | Fujiwara et al. | |

FOREIGN PATENT DOCUMENTS

| JP | 06139687 | 5/1994 |
|---|---|---|
| JP | 06-325508 | 11/1994 |
| JP | 09-245419 | 9/1997 |
| JP | 10-199120 | 7/1998 |
| JP | 2003-297025 | 10/2003 |
| JP | 2005-056473 | 3/2005 |

* cited by examiner

*Primary Examiner*—K. Wong

(57) ABSTRACT

Embodiments in accordance with the present invention provide a disk storage device and a control method for the disk storage device, which are capable of precluding an off-track write resulted from stick-slip caused by thermal distortion. A magnetic disk device is provided with a magnetic disk, a head that makes a writing to the magnetic disk, and a temperature sensor that detects the temperature inside of the magnetic disk device. Moreover, the magnetic disk device 1 changes determination requirements for use to make a determination whether or not to prohibit the writing by the head to the magnetic disk based on a measurement temperature detected by the temperature sensor and an amount of temperature change calculated using the measurement temperature.

17 Claims, 10 Drawing Sheets

| $T_{now}$ \ $T_{estimate}$ | C = 1.0 | | | C = 2.0 | | |
|---|---|---|---|---|---|---|
| | ≤28.0 | ≤49.9 | ≥50.0 | ≤28.0 | ≤49.9 | ≥50.0 |
| ≤32.0 | | | | with ΔT<0 | | |
| ≤39.9 | | | | | | |
| ≥40.0 | | | | | | with ΔT>0 |

DISK STORAGE DEVICE AND CONTROL METHOD FOR THE SAME

CROSS-REFERENCES TO RELATED APPLICATIONS

The instant nonprovisional application claims priority to Japanese Patent Application No. 2005-312446 filed Oct. 27, 2005 and incorporated by reference herein for all purposes.

BACKGROUND OF THE INVENTION

Embodiments in accordance with the present invention relate to a disk storage device being typical of a magnetic disk device and, more specifically, to a technology of precluding erroneous writing as a result of influence by vibration caused by thermal distortion of components configuring the disk storage device.

In a magnetic disk device configured by a plurality of components each having a different thermal expansion coefficient, the difference of the thermal expansion coefficients among the components causes stress, i.e., thermal distortion, to a junction portion of the components. If the stress by the thermal distortion is concentrated at specific portions, this results in vibration called "chatter vibration" or "stick-slip". It is known that the stick-slip resulted from the thermal distortion easily occurs with a rapid temperature change exceeding a fixed temperature gradient. The temperature gradient here means the amount of temperature change per unit time. Because the magnetic disk device has been recently packed with much higher density for recording, even with a slight stick-slip, the recording head resultantly vibrates and thus an off-track write is generated. There is thus a problem of causing corruption of data recorded in any adjacent tracks.

[Patent Document 1] JP-A-6-325508
[Patent Document 2] JP-A-2003-297025
[Patent Document 3] JP-A-10-199120

With an object of reducing the thermal distortion resulting from difference of the thermal expansion coefficients among the constituent components, for example, Patent Document 1 describes the technology of providing a carriage high in reliability by reducing the thermal expansion coefficient of a carriage made of magnesium alloy for use for a magnetic disk device, and by reducing the thermal stress and the thermal distortion caused by the difference of thermal expansion coefficient from other material for combination use.

The technology described in Patent Document 1 actually offers effects of decreasing the thermal distortion. With a highly-packed magnetic disk device for recording, however, there are possibilities of causing corruption of recording data even with a slight stick-slip, and having a difficulty of completely preventing the stick-slip from occurring due to the thermal distortion because the magnetic disk device is configured by a plurality of components. There thus remains a possibility of causing corruption of recording data due to stick-slip.

On the other hand, various many patent applications have been so far filed about the technology for a disk storage device being typical of a magnetic disk device, aiming to protect the recording data and increase the device reliability irrespective of the temperature environment. For example, Patent Document 2 describes the technology of, with a temperature sensor provided for detecting the temperature inside of the disk device, changing the manner of a writing process depending on whether the temperature is within a range of operation guarantee temperature for a magnetic disk device. More in detail, when the temperature of a magnetic disk device does not fall in the range of the operation guarantee temperature, verification is made after writing to a disk to see whether the writing was made in a normal manner. When any error is found by such verification, the writing is retried again, and after the retry is made for a predetermined number of times, the writing process is prohibited.

Patent Document 3 describes, for the purpose of preventing the access time from being lengthened, detecting the temperature in the surrounding environment of a magnetic disk device (hereinafter, referred to as environment temperature), and when the temperature is equal to or higher than a fixed value, stopping the long seek operation, reducing the transfer rate for a signal processing IC, and when the temperature is equal to or higher than a fixed value, prohibiting the writing operation. Patent Document 3 also describes estimating the temperature that is expected to be reached after a minute based on a past record about the temperature change, and based thereon, exercising control over fans and heaters in a close range, and exercising control over the magnetic disk device. More in detail, when the temperature is predicted to be high, control is exercised over the magnetic disk device and the fans, and when the temperature is predicted to be low, control is exercised over the heaters. Note here that the specific details of the control application over the magnetic disk device with the high temperature prediction are similar to those of the control application with the high temperature detection, e.g., writing prohibition, prohibition of the long-seek operation, and others.

With the disk storage device configured by a plurality of components each having a different thermal expansion coefficient, however, even when the temperature is within a range of the operation guarantee temperature for the device, the stick-skip occurs if the temperature rapidly changes, i.e., greater than a fixed temperature gradient. The technologies described in Patent Documents 2 and 3 are both those of detecting the compensation temperature for the operation of the magnetic disk device, and no consideration is given to the stick-slip caused by the thermal distortion. Therefore, no means is described therein for preventing an off-track write as a result of stick-slip.

As such, with the previous technologies described in Patent Documents 2 and 3 for detecting the operation guarantee temperature for a magnetic disk device, it is impossible to effectively prevent generation of an off-track write caused by stick-slip.

As described in the foregoing, with a disk storage device configured by a plurality of components each having a different thermal expansion coefficient, even when the temperature is within a range of the operation guarantee temperature for the device, stick-skip occurs due to thermal distortion if the temperature rapidly changes, i.e., greater than a fixed temperature gradient, thereby easily resulting in corruption of recording data by the off-track write.

The present invention is proposed in consideration of the problems described above, and an object thereof is to provide a disk storage device and a control method for the disk storage device, which are capable of preventing an off-track write caused by a stick-slip resulted from thermal distortion.

BRIEF SUMMARY OF THE INVENTION

Embodiments in accordance with the present invention provide a disk storage device and a control method for the disk storage device, which are capable of precluding an off-track write resulted from stick-slip caused by thermal distortion. A magnetic disk device is provided with a magnetic disk, a head that makes a writing to the magnetic disk, and a temperature sensor that detects the temperature inside of the magnetic disk device. Moreover, the magnetic disk device changes determination requirements for use to make a determination whether or not to prohibit the writing by the head to the magnetic disk based on a measurement temperature detected by the temperature sensor and an amount of temperature change calculated using the measurement temperature.

DETAILED DESCRIPTION OF THE INVENTION

Figure 1:
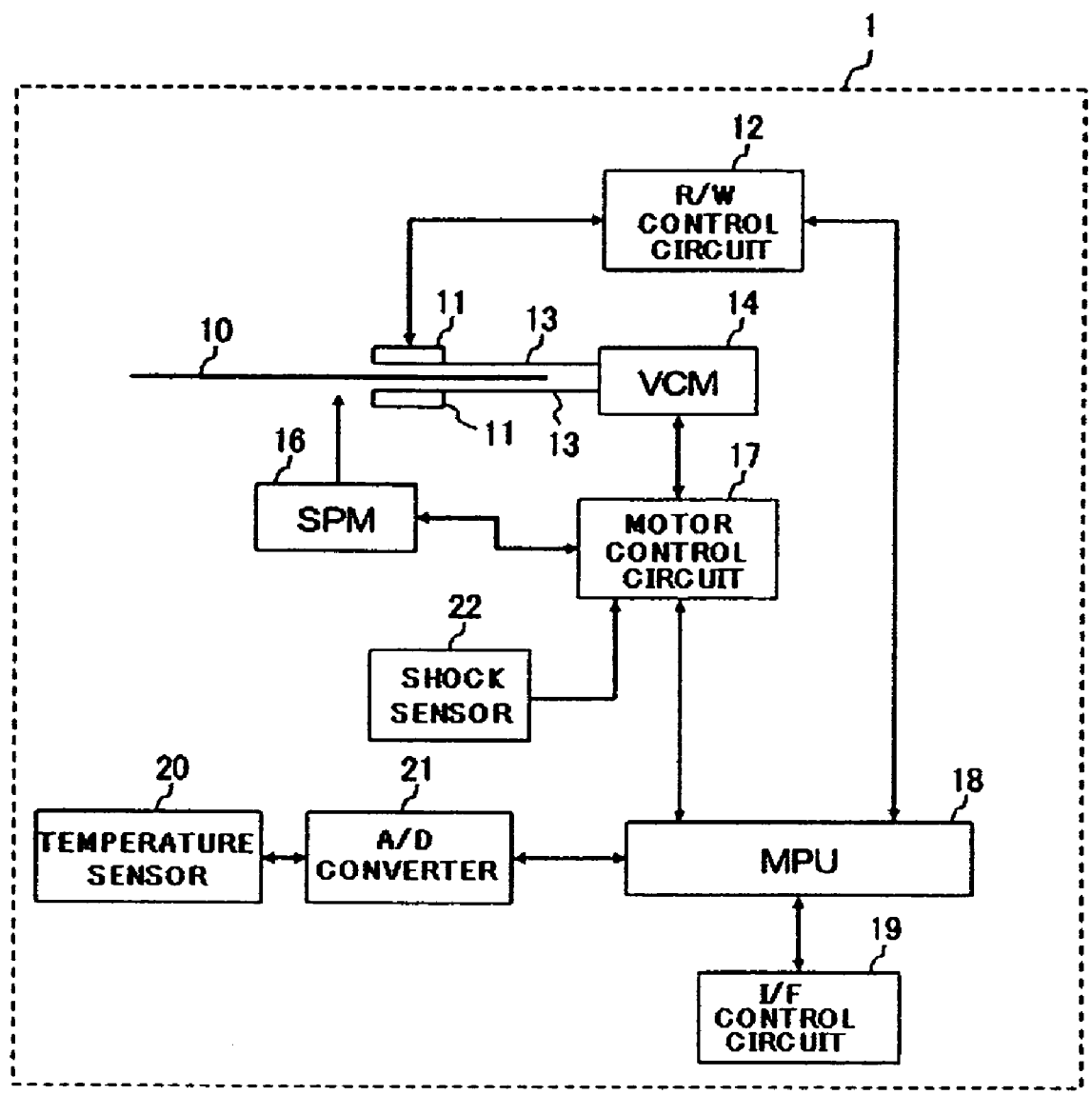
FIG. 1 is a diagram showing the configuration of a magnetic disk device of an embodiment of the present invention.

A disk storage device of the present invention is a magnetic disk device, including: a recording disk; a head for making a writing to the recording disk; and a temperature sensor that detects the temperature inside of the device. The device is characterized in making a change to determination requirements for use to make a determination whether or not to prohibit the head to make the writing to the recording disk based on a measurement temperature detected by the temperature sensor and an amount of temperature change calculated using the measurement temperature.

The possible likelihood of stick-slip caused by thermal distortion can be determined from the measurement temperature and the amount of temperature change. Therefore, with the above configuration, when the measurement temperature and the amount of temperature change show the circumstances of easily causing stick-slip by thermal distortion, the prohibition requirements for writing can be changed. For example, when the thermal distortion easily causes the stick-slip, the determination requirements about writing prohibition may be so changed to prohibit the writing when the amount of measurement having a correlation with the position fluctuations of the head does not vary that much. With this being the case, the recording disk can be prohibited from writing even if the amount of measurement changes very slightly at the initial occurrence stage of stick-slip so that generation of the off-track write due to the stick-slip can be prevented.

The disk storage device of the above can be also configured to calculate an estimation temperature that is expected to be reached in the future from the measurement temperature and the amount of temperature change, and change the determination requirements when the measurement temperature is higher than a first reference temperature, and when the estimation temperature is higher than a second reference temperature that is higher than the first reference temperature. The stick-slip often occurs when the temperature rapidly increases in the high-temperature area in which the temperature is equal to or higher than a predetermined temperature. With the above configuration, through comparison between the measurement temperature and the first reference temperature, the temperature area is determined whether it is likely to cause the stick-slip, and through comparison between the estimation temperature and the second reference temperature, it is estimated whether or not the temperature increase, if any, is rapid therein. In this manner, it becomes able to determine, with certainty, that the area is the high temperature area easily causing the stick-slip due to thermal distortion, and the prohibition requirements can be changed for writing. This effectively prevents the off-track write from occurring.

The disk storage device of the above can be also configured to calculate an estimation temperature that is expected to be reached in the future from the measurement temperature and the temperature gradient, and change the determination requirements when the measurement temperature is lower than a third reference temperature, and when the estimation temperature is lower than a fourth reference temperature that is lower than the third reference temperature. The stick-slip often occurs when the temperature rapidly decreases in the low-temperature area in which the temperature is equal to or lower than a predetermined temperature for the case of temperature decrease. With the above configuration, through comparison between the measurement temperature and the third reference temperature, the temperature area is determined whether it is likely to cause the stick-slip, and through comparison between the estimation temperature and the fourth reference temperature, it is estimated whether or not the temperature decrease, if any, is rapid therein. In this manner, it becomes able to determine, with certainty, that the area is the low-temperature area easily causing the stick-slip due to thermal distortion, and the prohibition requirements can be changed for writing. This effectively prevents the off-track write from occurring.

In the above disk storage device, the determination whether or not to prohibit the writing to the magnetic disk is made by comparison between a threshold value and an amount of measurement having a correlation with position fluctuations of the head, and the determination requirements are changed by changing the threshold value.

Moreover, the disk storage device of the above can be also configured to include: a carriage that supports the head; a shock sensor that detects a mechanical shock; a voice coil motor that is driven by a drive voltage or a drive current reflected with an output of the shock sensor, and puts the carriage in a swinging motion; and a detection section that detects the drive voltage or the drive current. In the device, the determination is made whether or not to prohibit the writing to the magnetic disk depending on whether or not the voltage detected by the detection section exceeds a threshold value, and the determination requirements are changed by changing the threshold value for comparison with the voltage. The drive voltage or the drive current of the voice coil motor often suffers from the stick-slip vibration sooner than the head to change in position due to the slick-slip. Therefore, the drive voltage of the voice coil motor is monitored for any change, and when it is determined that the stick-slip is likely to occur, the slight change observed to the drive voltage is used as a cue to stop writing so that the stick-slip can be detected earlier than the case of detecting a position error signal or others indicating the position change of the head. This thus enables to prevent, with reliability, generation of the off-track write.

A disk storage device of another embodiment of the present invention is a disk storage device, including: a recording disk; a head for making a writing to the recording disk; a temperature sensor that detects a temperature inside of the device; a determination process section that detects fluctuations of an amount of measurement having a correlation with position fluctuations of the head, and makes a determination whether or not to prohibit the head to make the writing to the recording disk; and a requirements change process section that changes the determination requirements for application to the determination process section. In the device, based on a measurement temperature detected by the temperature sensor and an amount of temperature change calculated using the measurement temperature, the requirements change process section determines whether or not the device is in a temperature area that is likely to cause vibration by thermal distortion, and when determines that the device is in the temperature area that is highly likely to cause the vibration by the thermal distortion, the determination requirements are changed.

With such a configuration, the possible likelihood of the stick-slip due to thermal distortion can be determined, and based on the determination result, the writing prohibition requirements can be changed. If it is determined that the stick-slip is likely to occur due to thermal distortion, for example, the determination requirements for use by the determination process section may be so changed as to prohibit the writing when the amount of measurement does not vary that much. With this being the case, the recording disk can be prohibited from writing even if the amount of measurement changes very slightly at the initial occurrence stage of stick-slip so that generation of the off-track write due to the stick-slip can be prevented. If it is determined that the stick-slip is not likely to occur due to thermal distortion, the determination requirements for writing prohibition may be set to be less strict, thereby enabling to stop erroneous detection of the stick-slip vibration or others.

Preferably, the determination process section detects any fluctuations observed in two or more amounts of measurement, and based on the detection result, determines whether or not to prohibit the writing by the head to the recording disk. With such a determination making based on any fluctuations observed in two or more amounts of measurement, when one of the amounts of measurement cannot be detected for any fluctuations, the remaining amount of measurement is still available for fluctuations detection so that a determination can be made to prohibit the writing or not. As such, the determination can be made with better accuracy.

The disk storage device may be further provided with a shock sensor that is capable of detecting vibration caused by thermal distortion. In the device, the measurement temperature of the temperature sensor is stored when the vibration is detected by the shock sensor, and the stored measurement temperature is used as a basis to change boundary temperature requirements for use to determine whether or not the device is in a temperature area that is likely to cause vibration by thermal distortion. With such a configuration, a determination making can be optimized to see whether the device is in the temperature area that is likely to cause vibration by the thermal distortion.

A control method for a disk storage device of the present invention is directed to a control method for a disk storage device, including: a recording disk; a head for making a writing to the recording disk; and a temperature sensor that detects the temperature inside of the device. In the device, an amount of temperature change is calculated from a past temperature record using the measurement temperature detected by the temperature sensor, and based on the measurement temperature and the amount of temperature change, determination requirements are changed for use to determine whether or not to prohibit the head to make the writing to the recording disk.

As described in the foregoing, the possible likelihood of stick-slip caused by thermal distortion can be determined from the measurement temperature and the amount of temperature change. Therefore, with the above control method, when the measurement temperature and the amount of temperature change show the circumstances of easily causing stick-slip by thermal distortion, the prohibition requirements for writing can be changed. For example, when the thermal distortion easily causes the stick-slip, the determination requirements for writing prohibition may be so changed as to prohibit the writing when the amount of measurement having a correlation with the position fluctuations of the head does not vary that much. With this being the case, the recording disk can be prohibited from writing even if the amount of measurement changes very slightly at the initial occurrence stage of stick-slip so that generation of the off-track write due to the stick-slip can be prevented.

In an alternative manner, in the control method, an estimation temperature that is expected to be reached in the future may be calculated from the measurement temperature and the amount of temperature change, and the determination requirements may be changed when the measurement temperature is higher than a first reference temperature, and when the estimation temperature is higher than a second reference temperature that is higher than the first reference temperature. In this manner, it becomes able to change the writing prohibition requirements in the high-temperature area in which the stick-slip easily occurs due to thermal distortion so that generation of the off-track write can be effectively prevented.

In still alternative manner, in the control method, an estimation temperature that is expected to be reached in the future may be calculated from the measurement temperature and the temperature gradient, and the determination requirements may be changed when the measurement temperature is lower than a third reference temperature, and when the estimation temperature is lower than a fourth reference temperature that is lower than the third reference temperature. In this manner, it becomes able to change the writing prohibition requirements in the low-temperature area in which the stick-slip easily occurs due to thermal distortion so that generation of the off-track write can be effectively prevented.

In still alternative manner, in the control method, the determination requirements may be changed when the measurement temperature is higher than a reference temperature, when the amount of temperature change is positive, and when an absolute value of the amount of temperature change is larger than a reference amount. In this manner, it becomes able to change the writing prohibition requirements in the high-temperature area in which the stick-slip easily occurs due to thermal distortion so that generation of the off-track write can be effectively prevented.

In still alternative manner, in the control method, the determination requirements may be changed when the measurement temperature is lower than a reference temperature, when the amount of temperature change is negative, and when an absolute value of the amount of temperature change is larger than a reference amount. In this manner, it becomes able to change the writing prohibition requirements in the low-temperature area in which the stick-slip easily occurs due to thermal distortion so that generation of the off-track write can be effectively prevented.

According to the present invention, there can be provided a disk storage device and a control method for the disk storage device, which are able to prevent generation of an off-track write resulted from stick-slip caused by thermal distortion.

In the below, specific embodiments applied with the present invention are described in detail by referring to the accompanying drawings. In the drawings, any same components are provided with the same reference numeral, and for explicit description, any same description is not made again if appropriate. Note here that, in the embodiments described below, the present invention is applied to a magnetic disk device.

First Embodiment

FIG. 1 shows the configuration of a magnetic disk device 1 of this embodiment. In FIG. 1, the magnetic disk device 1 is equipped with a magnetic disk 10 serving as a recording medium for recording of data. The magnetic disk 10 is a nonvolatile memory that becomes available for recording of data through magnetization of a magnetic layer. The magnetic disk 10 is fixed to a hub of an SPM 16. The SPM 16 rotates the magnetic disk 10 with a predetermined speed.

A head 11 includes a recording element that converts an electric signal to a magnetic field in accordance with the recording data to the magnetic disk 10, and a reproduction element that converts a magnetic field from the magnetic disk 10 to an electric signal. The head 11 is held at the tip end portion of a carriage 13.

The carriage 13 is fixed to a voice coil motor (VCM) 14. The VCM 14 is an actuator mechanism for moving the head 11 onto any arbitrary track of the magnetic disk 10. When the VCM 14 is put in a swinging motion, the head 11 moves on the magnetic disk 10. A motor control circuit 17 drives the VCM 14 and the SPM 16 in accordance with a control signal coming from a microprocessor (MPU) 18.

An R/W control circuit 12 goes through a demodulation process, a serial-parallel conversion process, or others to the writing data to the magnetic disk 10, and sends out a writing signal to the head 11 via a write driver (not shown). The R/W control circuit 12 also applies a demodulation process to a reproduction signal read by the head 11 from the magnetic disk 10, and outputs the restored reading data to the MPU 18.

The MPU 18 is a processor that exercises control over the magnetic disk device 1 in its entirety, and takes charge of positioning control over the head 11, permission issue for data writing/data reading to/from the R/W control circuit 12, error management, and the like. The MPU 18 of this embodiment receives an output of a temperature sensor 20 via an A/D converter 21, and can acquire the temperature inside of the magnetic disk device 1. Moreover, the MPU 18 uses the acquired temperature data to calculate the temperature gradient and the estimation temperature inside of the magnetic disk device 1 expected to be reached in the future, and applies a process of changing the writing prohibition requirements to the magnetic disk 10. The details of such processes will be described later.

An interface control circuit 19 exercises control over the interface with a high-end system externally provided to the device or with any other magnetic disk device. The writing data coming from the outside of the magnetic disk device 1 is received by the MPU 18 via the I/F control circuit 19, and is written by the head 11 to the magnetic disk 10 via the R/W control circuit 12. The data stored in the magnetic disk 10 is read by the head 11, and is output to the outside via the I/F control circuit 19.

A shock sensor 22 is a sensor that can detect a mechanical shock applied to the magnetic disk device 1. The shock sensor 22 is a sensor that detects the shock through detection of displacement, speed, or acceleration, for example. The output of the shock sensor 22 is input to the motor control circuit 17, and is reflected to the drive voltage of the VCM 14.

In accordance with an embodiment of the present invention, a magnetic disk device 1 is provided with a magnetic disk 10, a head 11 that makes a writing to the magnetic disk 10, and a temperature sensor 20 that detects the temperature inside of the magnetic disk device 1. Moreover, the magnetic disk device 1 changes determination requirements for use to make a determination whether or not to prohibit the writing by the head 11 to the magnetic disk 10 based on a measurement temperature detected by the temperature sensor 20 and an amount of temperature change calculated using the measurement temperature.

Figure 2:
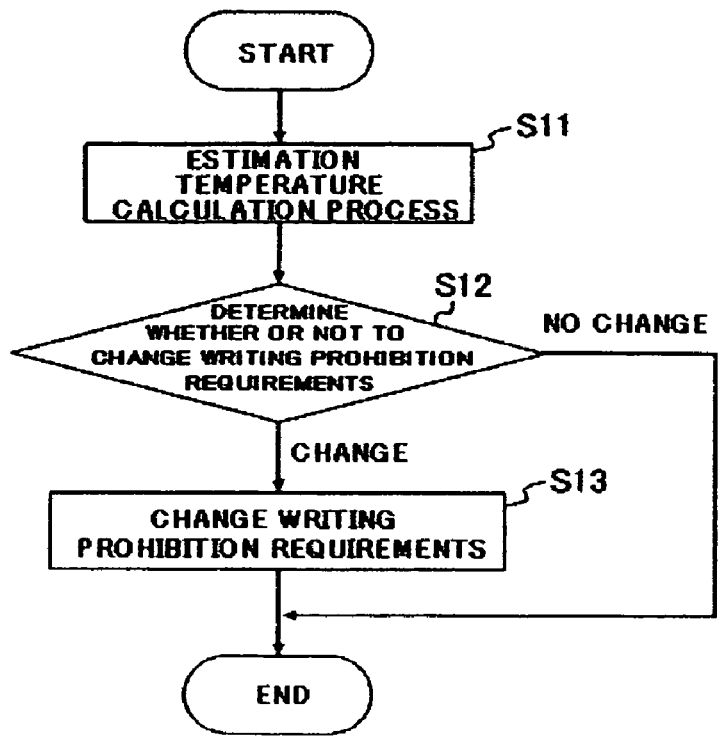
FIG. 2 is a flowchart showing the process of changing writing prohibition requirements in an embodiment of the present invention.

Described next is the process executed by the MPU 18 to change the writing prohibition requirements. FIG. 2 shows the flowchart of the process of changing the writing prohibition requirements. First of all, in step S11, an output value of the temperature sensor 20 is acquired, and the acquired output value, i.e., the value of the current temperature, is used to calculate the estimation temperature that is derived by estimating the temperature expected to be reached in the future.

Figure 3:
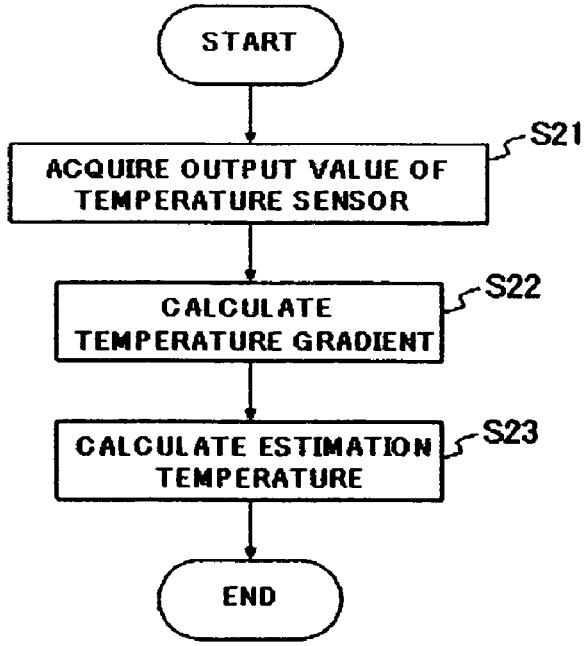
FIG. 3 is a flowchart showing the process of calculating an estimation temperature in an embodiment of the present invention.

Here, FIG. 3 shows an exemplary process flow of the estimation temperature calculation process. First of all, in step S21, an output value of the temperature sensor 20 is acquired. In step S22, using the output value of the temperature sensor acquired in step S21, i.e., the current temperature, and the past temperature record stored in a storage section such as RAM (not shown) equipped in the MPU 18 or connected externally to the MPU 18, the temperature gradient is calculated. More specifically, for example, the result derived by calculating the difference between the current temperature and the past temperature is the temperature gradient, the unit time of which is the time cycle of temperature acquisition. In step S23, using the current temperature and the temperature gradient, the estimation temperature is calculated.

Referring back to FIG. 2, in step S12, a determination is made whether there needs to change the writing prohibition requirements. More in detail, when the temperature gradient and the estimation temperature calculated in step S11 are in the area where the stick-slip caused by thermal distortion is highly likely to result in the off-track write, the writing prohibition requirements are changed to be stricter. On the other hand, if they are off the area where the off-track write is generated with a high possibility, the writing prohibition requirements are changed to be those normal relatively less strict.

In step S13, when it is determined in step S12 to change the writing prohibition requirements, the writing prohibition requirements are accordingly changed. By repeating the processes from step S11 to S13 with at established time intervals, the writing prohibition requirements can be adoptively changed based on the requirements for the temperature.

Here, the writing prohibition requirements are threshold requirements whether to permit or prohibit the writing to the magnetic disk 10. In this specification, such threshold requirements are referred to as writing prohibition requirements, but sometimes are referred also to as writing permission requirements. Moreover, the writing prohibition requirements being strict means deriving the requirements with which the state transition to writing prohibition is easy by setting lower the threshold value for use as a basis for transition to the writing prohibition state. The threshold requirements that are set as the writing prohibition requirements can vary in requirements. For example, the writing prohibition requirements may be the threshold value set based on the amount of fluctuations observed to the drive voltage of the VCM 14, the amount of fluctuations observed to the current of the VCM 14, the size of a position error signal indicating the displacement in position between the center of the track of the magnetic disk 10 and the head 11, the size of the vibration amplitude detected by the shock sensor provided inside of the magnetic disk device, and the like. These may be plurally combined for use as the writing prohibition requirements. In short, if the writing operation is in progress when the head 11 is largely displaced in position from the center of the track of the magnetic disk 1 by the stick-slip vibration, this results in generation of the off-track write. Therefore, the above-described requirements are not the only possibilities, and the writing prohibition requirements may be the threshold requirements set against the amount of measurement having a direct or indirect correlation to the position fluctuations of the head 11.

Note here that the process of changing the writing prohibition requirements described by referring to FIGS. 2 and 3 can be implemented as below. That is, a firmware program written with the process procedure of changing the writing prohibition requirements is stored in a storage section (not shown) such as ROM or flash memory equipped inside of the MPU 18 or externally connected to the MPU 18. The firmware program is executed by the MPU 18, and the computation process by the MPU 18 is executed in collaboration with the control exercised over the temperature sensor 20, the motor control circuit 17, the R/W control circuit 12, and others.

Described below is a specific example of the aforementioned estimation temperature calculation process by referring to FIGS. 4 to 8. In this example, using the current temperature $T_{now}$ acquired from the temperature sensor 20 for every five minutes and the amount of temperature change $\Delta T$ in 5 minutes, the estimation temperature $T_{estimate}$ that is expected to be reached in the future is calculated by the simple equation shown below as equation (1). Moreover, $\Delta T$ is expressed by (2).

$$T_{estimate} = T_{now} + C \times \Delta T \quad (1)$$

$$\Delta T = T_{now} - T_{previous} \quad (2)$$

where the coefficient C is a weight coefficient for the amount of temperature change $\Delta T$, and the $T_{previous}$ is the temperature acquired from the temperature sensor 20 five minutes before the acquisition time of the current temperature $T_{now}$.

Figure 4:
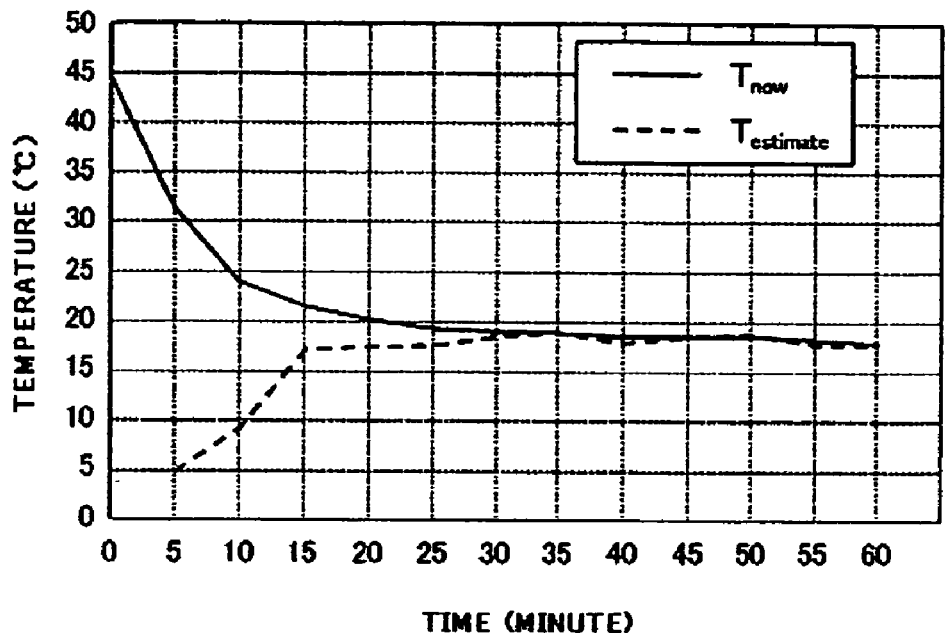
FIG. 4 is a graph showing the result of the estimation temperature calculation in an embodiment of the present invention.
Figure 5:
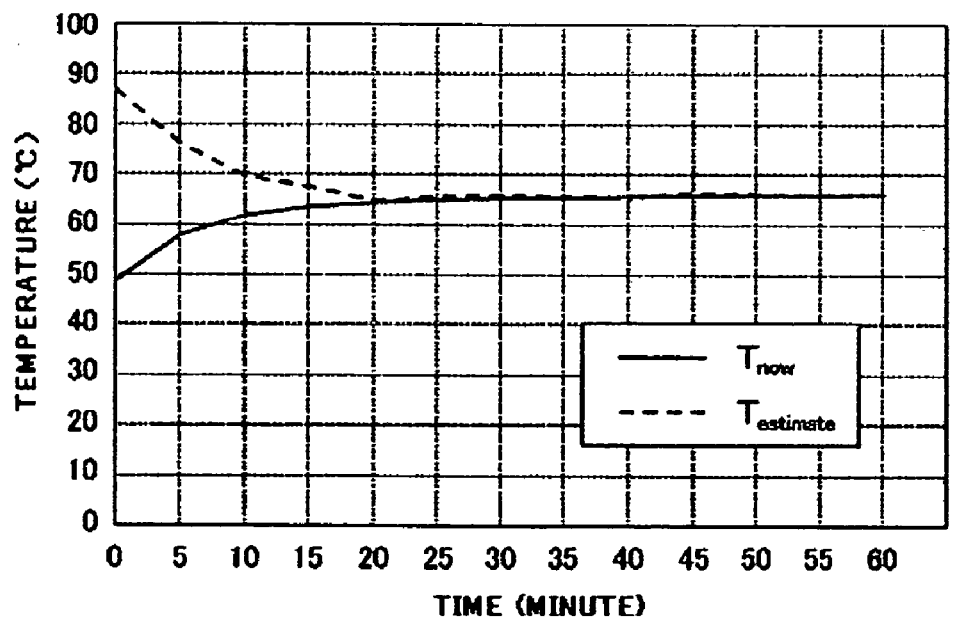
FIG. 5 is a graph showing the result of the estimation temperature calculation in an embodiment of the present invention.

In this example, the coefficient C of the equation (1) is determined based on the value of $\Delta T$ so as to be adaptive to the graphs of $T_{now}$ in FIGS. 4 and 5 indicating the actual temperature change of the magnetic disk device. More specifically, when the absolute value of $\Delta T$, i.e., $|\Delta T|$ is 0.8 or larger, C will be 2.0, and when $|\Delta T|$ is smaller than 0.8, C will be 1.0. When C is 2.0, it denotes that the ratio of the future temperature change, i.e., the future temperature gradient, is assumed as being twice of that of the past five minutes. When C is 1.0, it denotes that the future temperature gradient is assumed as being the same as the temperature gradient of the past five minutes.

$T_{now}$ indicated by the solid line in FIG. 4 is the graph derived by plotting the internal temperature of a specific magnetic disk device acquired for every five minutes when the magnetic disk device is disposed under the environment of low temperature (5 degrees). The broken line in FIG. 4 is the graph derived by plotting the estimation temperature $T_{estimate}$ calculated for every five minutes using the above equation (1). As is known from FIG. 4, according to the equation (1), in the first 20 minutes or so after the magnetic disk device is disposed under the environment of low temperature, especially the estimation temperature is overestimated. This is because the value 2.0 is selected for the coefficient value of C in the above equation (1). By overestimating the estimation temperature or the future temperature gradient, it becomes able to make a change to the writing prohibition requirements being stricter. This is considered effective in view of preventing the off-track write. As the value of $T_{now}$ converges, $\Delta T$ becomes closer to zero so that $T_{estimate}$ converges similarly to $T_{now}$.

On the other hand, $T_{now}$ indicated by the solid line in FIG. 5 is the graph derived by plotting the internal temperature of a specific magnetic disk device acquired for every five minutes when the magnetic disk device is disposed under the environment of high temperature (55 degrees). The broken line in FIG. 5 is the graph derived by plotting the estimation temperature $T_{estimate}$ calculated for every five minutes using the equation (1). In this case, similarly to FIG. 4, in the first 20 minutes or so after the magnetic disk device is disposed under the environment of high temperature, especially the estimation temperature is overestimated.

Figure 6:
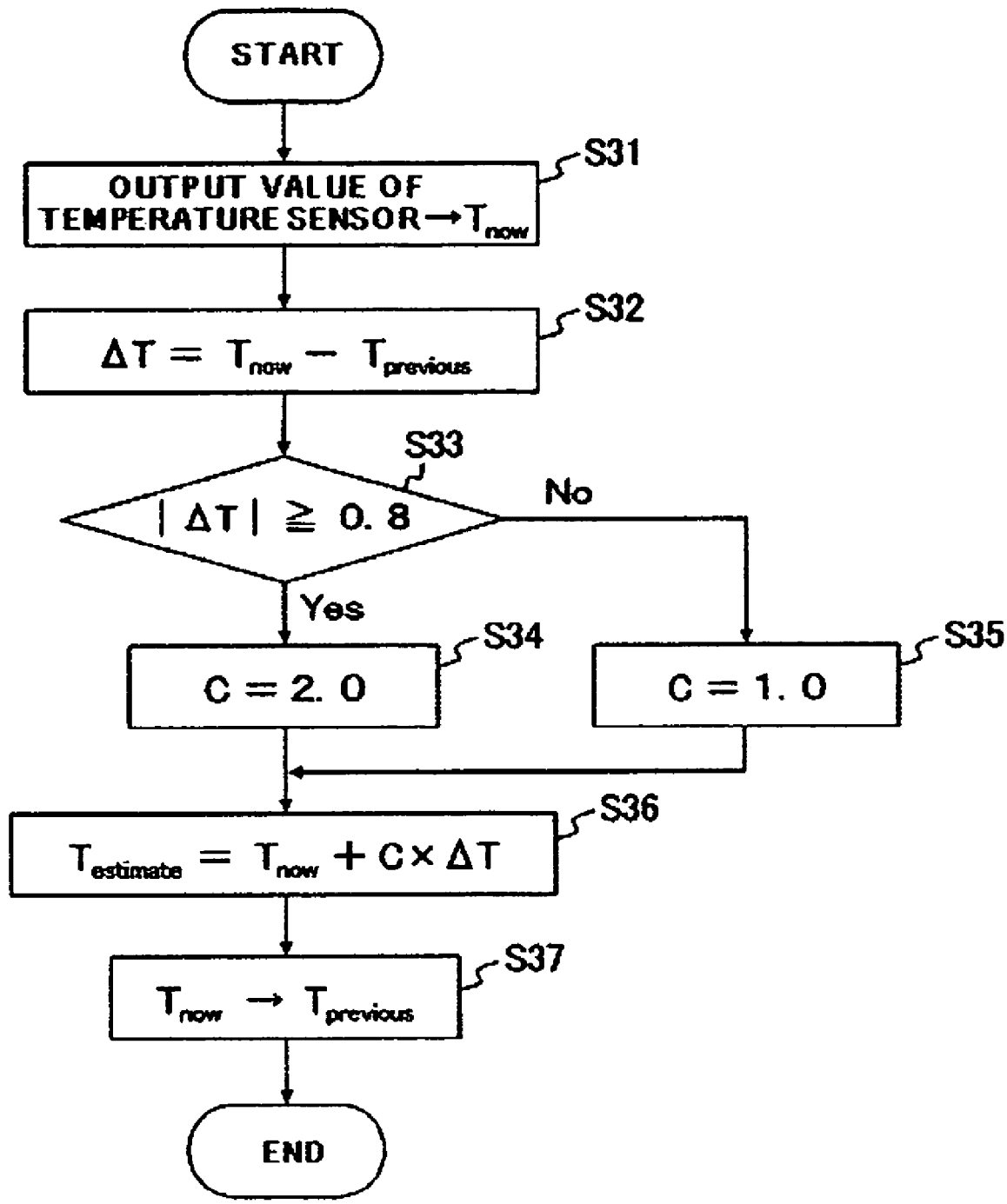
FIG. 6 is a flowchart showing the process of calculating the estimation temperature in an embodiment of the present invention.

Next, an exemplary procedure of calculating the estimation temperature $T_{estimate}$ using the equation (1) for every five minute is shown in the flowchart of FIG. 6. FIG. 6 shows a specific example of the estimation temperature calculation process shown in FIG. 3. First of all, in step S31, a variable $T_{now}$ indicating the current temperature stores the output value of the temperature sensor 20. In step S32, using the variable $T_{previous}$ storing the 5-minutes-old output value of the temperature sensor and the variable $T_{now}$ indicating the current temperature, the amount of temperature change $\Delta T$ is calculated. In steps S33 to S35, the coefficient C is determined based on the size of the absolute value calculated for $\Delta T$. As described in the foregoing, in this example, when the absolute value $|\Delta T|$ is 0.8 or larger, C will be 2.0, and when $|\Delta T|$ is smaller than 0.8, C will be 1.0. In step S36, using the aforementioned equation (1), the estimation temperature $T_{estimate}$ is calculated. In step S37, to calculate the estimation temperature after the lapse of the next predetermined time (5 minutes), the value of the variable $T_{now}$ is stored to the variable $T_{previous}$, which indicates the past (5 minutes before) temperature.

By referring to FIGS. 7 and 8, described next is a specific example of changing the writing prohibition requirements based on the estimation temperature calculated by the specific estimation temperature calculation process described above, the temperature gradient, and the current temperature.

Figures 7, 8:
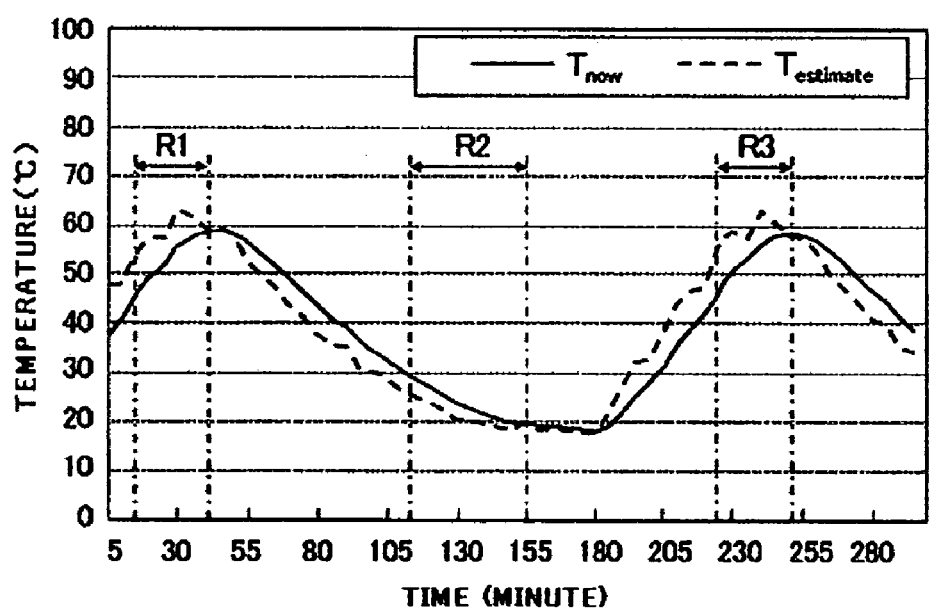
FIG. 7 is a diagram showing exemplary determination requirements at the time when the writing prohibition requirements are changed.
FIG. 8 is a graph for illustrating a specific example of the process of changing the writing prohibition requirements.

FIG. 7 is a table defining the relationship of the writing prohibition requirements to the current temperature $T_{now}$, the estimation temperature $T_{estimate}$, and the amount of temperature change (temperature gradient) ΔT, all of which are derived after the process in the flowchart of FIG. 6. In this example, the writing prohibition requirements are changed to be stricter when the coefficient C is 2.0, i.e., when the temperature change in the past 5 minutes is 0.8 degrees or more, when ΔT is negative, when the current temperature is 32 degrees or lower, and when the estimation temperature $T_{estimate}$ is 28 degrees or lower. The writing prohibition requirements are also changed to be stricter when the coefficient C is 2.0, i.e., when the temperature change in the past 5 minutes is 0.8 degrees or more, when ΔT is positive, when the current temperature is 40 degrees or higher, and when the estimation temperature $T_{estimate}$ is 50 degrees or lower. In the table of FIG. 7, two shaded areas are those for making stricter the writing prohibition requirements. The not-shaded areas in FIG. 7 are those for the writing operation with respect to the magnetic disk device with the normally-set writing prohibition requirements.

Basically, in the high-temperature portion in which the temperature is increased to the predetermined temperature or higher, and in the low-temperature portion in which the temperature is decreased to the predetermined temperature or lower, the stick-slip easily occurs due to thermal distortion. Therefore, when the device is disposed under such an environment, the writing prohibition requirements for application may be made stricter. Therefore, in this example, as described in the foregoing, the writing prohibition requirements are changed to be stricter when the current temperature is higher than the first reference temperature (for example, 40 degrees), and when the estimation temperature calculated using the temperature gradient is equal to or higher than the second reference temperature (for example, 50 degrees) that is higher than the first reference temperature. The writing prohibition requirements are also changed to be stricter when the current temperature is lower than the third reference temperature (for example, 32 degrees), and when the estimation temperature calculated using the temperature gradient is equal to or lower than the fourth reference temperature (for example, 28 degrees) that is lower than the third reference temperature. The first and third reference temperatures represent the boundary temperature in the temperature area in which the stick-slip easily occurs. Moreover, the difference between the first and second reference temperatures, and the difference between the third and fourth reference temperatures represent the temperature gradient that easily cause the stick-slip.

FIG. 8 shows the graph indicating, when the writing prohibition requirements are changed in accordance with the aforementioned table of FIG. 7, the area of the stricter writing prohibition requirements for application to the magnetic disk device 1 under the temperature cycle environment. The solid line in the drawing indicates the measured value $T_{now}$ derived by the temperature sensor 20, and the broken line in the drawing indicates the estimation temperature $T_{estimate}$. In the areas of R1 and R3 in the drawing, the current internal temperature is high (40 degrees or higher), the estimation temperature for 5 minutes later is expected to be much higher (50 degrees or higher), and the absolute value of the temperature gradient is large (estimation coefficient=2.0) so that the writing prohibition requirements are changed to be stricter. In the area of R2 in the drawing, the current temperature is low (32 degrees or lower), the estimation temperature for 5 minutes later is expected to be much lower (28 degrees or higher), and the absolute value of the temperature gradient is large (estimation coefficient=2.0) so that the writing prohibition requirements are also changed to be stricter.

As described in the foregoing, as the writing prohibition requirements, possibly used are threshold requirements that are set based on the amount of fluctuations observed in the drive voltage of the VCM 14, the amount of fluctuations observed in the current of the VCM 14, the size of a position error signal (PES) indicating the displacement in position between the center of the track of the magnetic disk 10 and the head 11, the size of the vibration amplitude detected by the shock sensor provided inside of the magnetic disk device, and the like. The position error signal is a signal indicating the displacement of the head 11 from the center of the track, and mainly is a signal to be used for positioning control of the head 11.

Herein, with respect to the writing prohibition requirements, for the purpose of precluding the off-track write caused by the stick-slip, it is also possible to set the threshold requirements being always strict under every temperature environment. However, if with the always-strict threshold requirements, the frequency of erroneous detection of vibration is increased, thereby resulting in a problem of impairing the access capability of the magnetic disk device.

On the other hand, like the magnetic disk device 1 of this embodiment, the strict writing prohibition requirements are applied only when the device is in the temperature area easily causing stick-slip due to thermal distortion, and in other cases, the writing prohibition requirements to be applied are made less strict than normally applied. This accordingly enables to prevent the off-track write resulted from the stick-slip, and to keep good the access capability of the magnetic disk device 1.

Figure 9:
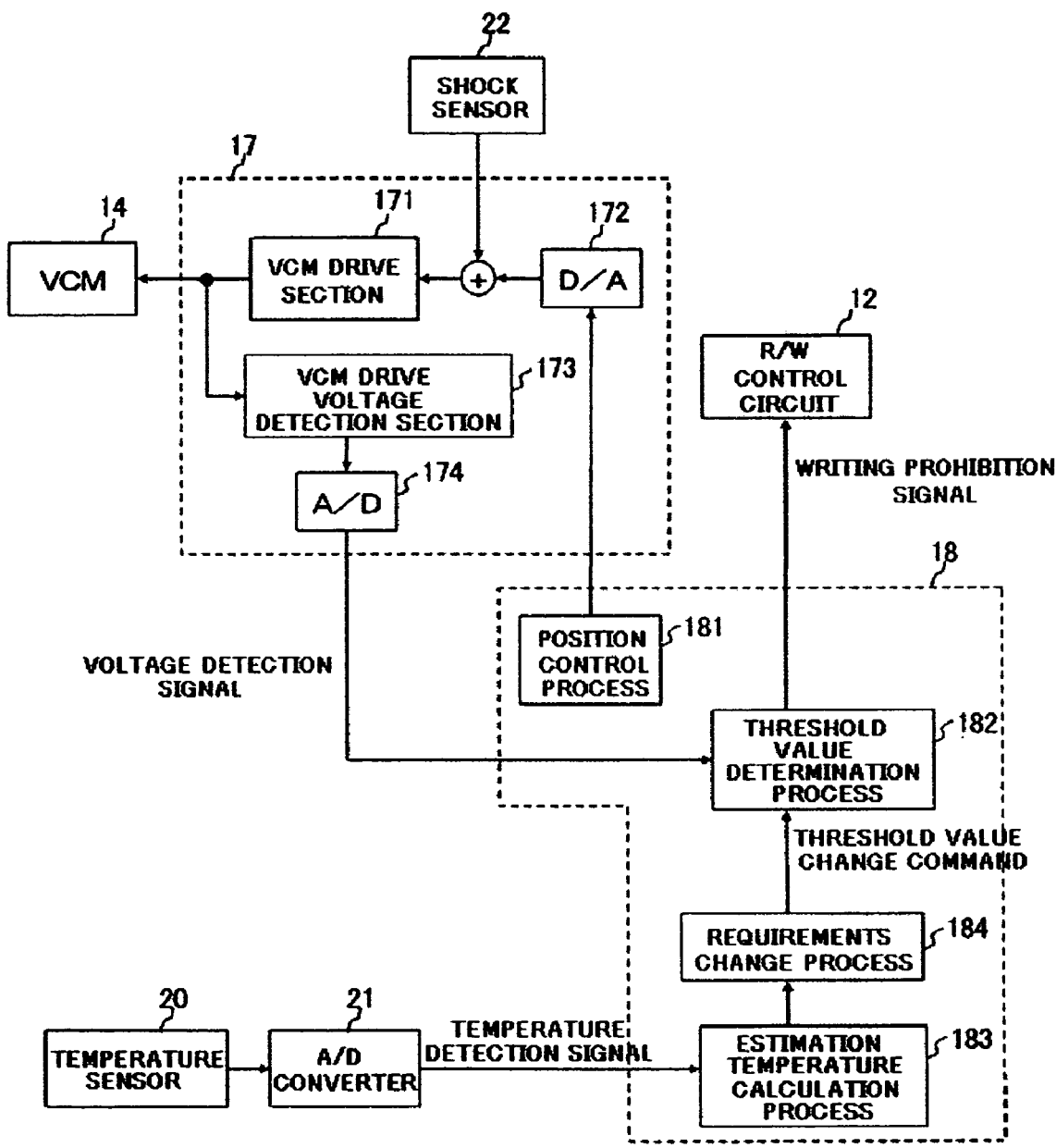
FIG. 9 is a diagram showing the configuration of main components in the magnetic disk device of an embodiment of the present invention.

In the below, described are specific exemplary writing prohibition requirements, and a specific exemplary requirements change made to the writing prohibition requirements. In the below, specifically described is a case where the writing prohibition requirements are the threshold requirements set to the amplitude of the drive voltage of the VCM 14 (hereinafter, referred to as VCM voltage), and when the VCM voltage exceeds the threshold value and largely fluctuates, the writing to the magnetic disk 10 is prohibited. FIG. 9 shows the configuration of the main components in the magnetic disk device 1 in such a case.

In FIG. 9, a VCM drive section 171 equipped in the motor control circuit 17 supplies the current to the coil of the VCM 14, and drives the VCM 14. The drive current to the VCM 14 is controlled by input, to the VCM drive section 171 via a D/A converter 172, a control signal output by a position control process section 181 equipped in the MPU 18. Moreover, as shown in FIG. 9, a control signal provided to the VCM drive section 171 from the position control process section 185 is overlaid with an output signal of the shock sensor 22, and the VCM drive voltage is controlled in such a manner as to cancel off the vibration caused by the shock detected by the shock sensor 22. As such, the current and drive voltage supplied to the VCM 14 by the VCM drive section 171 are reflected with the shock detected by the shock sensor 22. Therefore, by monitoring the fluctuations of the VCM voltage, it becomes possible to detect the shock.

A VCM drive voltage detection section 173 detects the drive voltage of the VCM 14 (VCM voltage). The output of the VCM drive voltage detection section 173 is input to the MPU 18 via an A/D converter 174.

The position control process section 181 equipped in the MPU 18 exercises positioning control over the head 11. The positioning control over the head 11 is exercised roughly as below. First of all, the data read from the magnetic disk 10 by the reproduction element of the head 11 is input to the R/W control circuit 12 so as to detect servo data, and from thus detected servo data, the head position information is acquired. The position control process section 181 receives the head position information acquired by the R/W control circuit, and using the head position information, calculates the head position and the head speed. Moreover, the position control process section 181 determines a control signal based on the calculated head position and head speed for provision to the VCM drive section 13. Note here that the head positioning control by the magnetic disk device 11 is exercised similarly to the conventional control method, and thus no detailed description is given.

When the amount of fluctuations of the VCM voltage detected by the VCM drive voltage detection section 173 exceeds a threshold value, a threshold value determination process section 182 outputs a writing prohibition signal to the R/W control circuit 12, and prohibits the writing to the magnetic disk 10. That is, as the threshold value is reduced against the amount of fluctuations of the VCM voltage for application to the threshold value determination process section 182, the requirements will easily allow for transition to the state of writing prohibition. Therefore, reducing the threshold value for application to the threshold value determination process section 182 corresponds to change the writing prohibition requirements to be stricter.

An estimation temperature calculation process section 183 receives a temperature detection signal provided by the temperature sensor 20 via the A/D converter 21, and goes through the estimation temperature calculation process described by referring to FIG. 3 or 6 so as to calculate the temperature gradient and the estimation temperature. Using the temperature gradient and the estimation temperature calculated by the estimation temperature calculation process section 183, and the current temperature detected by the temperature sensor 20, a requirements change process section 184 determines whether or not to change the writing prohibition requirements of step S12 or S113 of FIG. 2. When determining to change the writing prohibition requirements, the requirements change process section 184 instructs the threshold value determination process section 182 to change the threshold value. More in detail, when determining that the temperature area easily causes the off-track write due to the stick-slip, the requirements change process section 184 instructs the threshold value determination process section 182 to change the threshold value so as to prohibit the writing if with the smaller fluctuations observed in the VCM voltage. Conversely, when determining that the temperature area hardly causes the off-track write due to the stick-slip, it instructs the threshold value determination process section 182 to change the threshold value so as to allow the larger fluctuations observed to the VCM voltage.

Herein, as described above, the threshold value determination process section 182, the estimation temperature calculation process section 183, and the requirements change process section 184 can be all implemented by executing the firmware program by the MPU 18.

Figure 10:
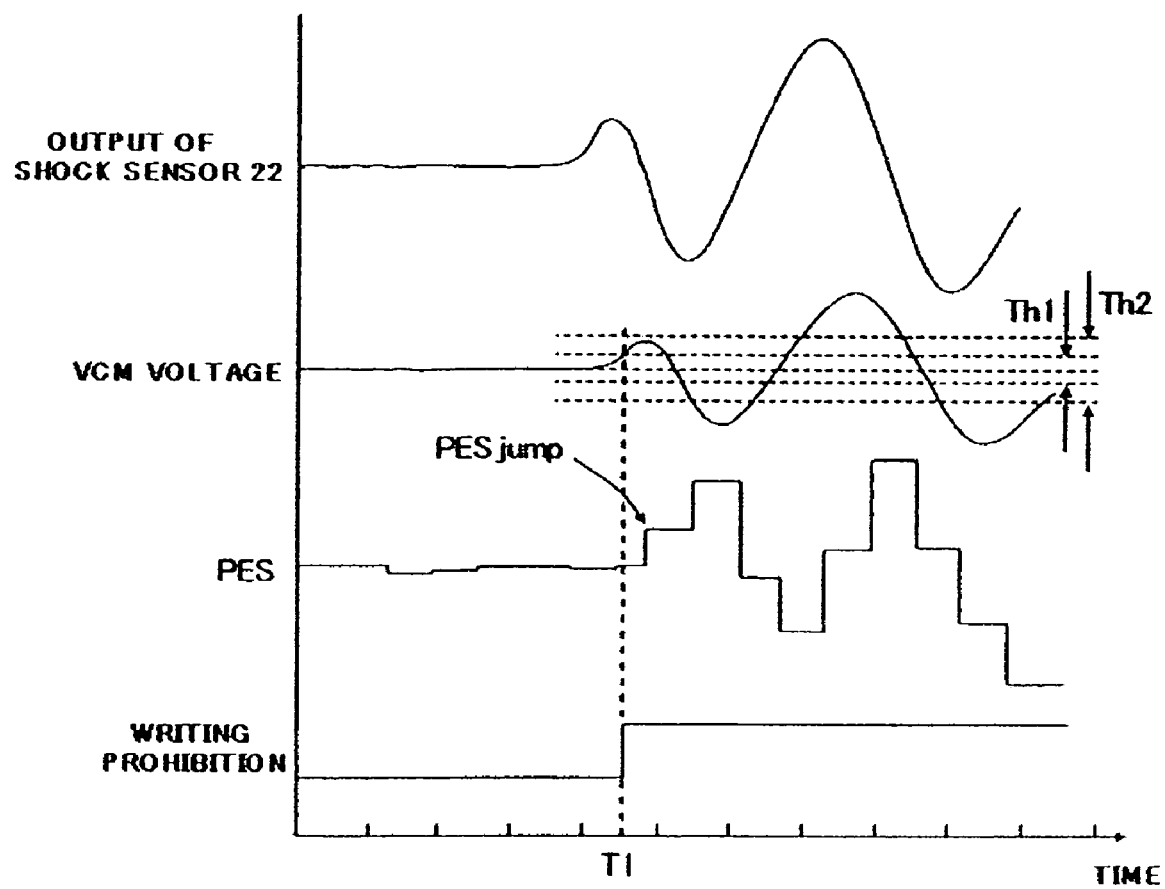
FIG. 10 is a timing chart for illustrating the operation of the magnetic disk device of an embodiment of the present invention.

FIG. 10 is a conceptual view showing the relationship among the shock detection by the shock sensor 22 at the time of occurrence of stick-slip, the VCM voltage, the position error signal (PES), and the writing prohibition signal output by the MPU 18 to the R/W control circuit 12. The position of the PES signal indicated by an arrow denotes the time when the PES largely fluctuates due to the vibrating head 11 as a result of the stick-slip. Such PES fluctuations are hereinafter referred to as PES jump. If the head 11 is in the course of writing when the PES jump is observed, the off-track write occurs.

Assuming here is that the threshold value for setting to the amount of fluctuations of the VCM voltage in the normal operation is Th2 of FIG. 10. When the temperature area is determined as easily causes the stick-slip based on the measurement temperature by the temperature sensor 20 and the temperature gradient derived thereby, the threshold value for the amount of fluctuations of the VCM voltage is changed to Th1 of FIG. 10. As such, by changing the threshold value of the VCM voltage for use to determine whether or not to prohibit the writing in accordance with the possible occurrence of the stick-slip, it becomes able to stop the writing operation to the magnetic disk 10 taken charge by the R/W control circuit 12 and the head 11 with an output of a writing prohibition signal earlier than the occurrence of PES jump (T1 of FIG. 10).

As such, the magnetic disk device 1 of this embodiment includes the mechanism of prohibiting the writing in accordance with the detection value of the VCM voltage, and dynamically changes the threshold value for use to prohibit the writing based on the measurement temperature by the temperature sensor 20 and the temperature gradient calculated thereby. That is, for the temperature area easily generating the off-track write due to the stick-slip, the threshold value is changed to prohibit the writing in response to any relatively-small fluctuations observed in the VCM voltage compared with the temperature area hardly generating the off-track write due to the stick-slip. This enables to detect sooner the stick-slip vibration and to transit earlier to the writing prohibition state so that generation of the off-track write can be suppressed. Conversely, for the temperature area hardly causing the off-track write due to the stick-slip, the threshold value is so changed as to allow the relatively-large fluctuations observed to a VCM voltage. In this manner, the vibration detection requirements by the VCM voltage are made less strict, and the access capability can be increased.

The aforementioned method of prohibiting the writing to the magnetic disk 10 through detection of the fluctuations of the VCM voltage is considered effective in view of enabling the writing prohibition with earlier timing compared with the previous popular method of prohibiting the writing through detection of the fluctuations observed in a position error signal. The position error signal is a signal to be output after the head 11 reads the servo data, and thus the time lag is relatively large until the effects of the vibration appear in the output value. On the other hand, because the VCM voltage can detect the effects of the vibration in a more direct manner, the occurrence of vibration can be detected sooner compared with the case of detecting the fluctuations of the position error signal. As such, by detecting the fluctuations of the VCM voltage to prohibit the writing, and by changing the threshold value for determination of the fluctuations of the VCM voltage based on the occurrence of the off-track write caused by the stick-slip, the vibration by the stick-slip can be detected much sooner. This enables to prevent the off-track write in a more effective manner. As an alternative to the fluctuations of the VCM voltage, the fluctuations of the drive current of the VCM 14 may be detected. Also in this case, the writing can be prohibited with much earlier timing compared with the method of prohibiting the writing after detecting the fluctuations of the position error signal.

Figure 11:
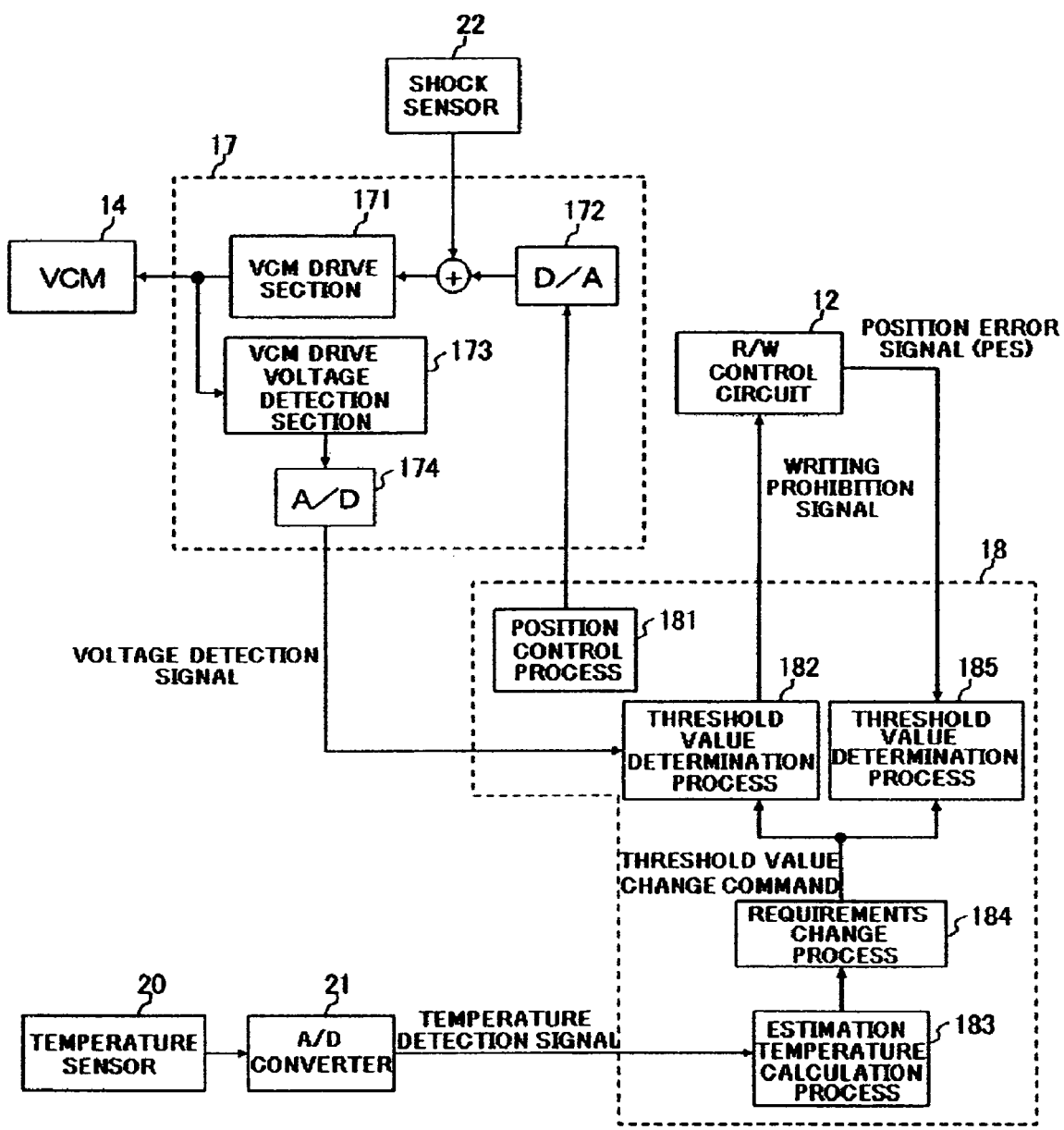
FIG. 11 is a diagram showing the main configuration of the magnetic disk device of an embodiment of the present invention.

In the below, as another specific example, described is a case with two of the threshold requirements in which the writing prohibition requirements are set to the amplitude of the drive voltage of the VCM 14 (VCM voltage), and threshold requirements in which the writing prohibition requirements are set to the size of the position error signal. FIG. 11 is a drawing showing the configuration of the main components in the magnetic disk device 1 in this case. In addition to the configuration shown in FIG. 9, a threshold value determination section 185 is further provided to execute a threshold value determination process by receiving the position error signal coming from the R/W channel 12. For a change of the writing prohibition requirements, the requirements change process section 183 instructs the threshold value determination process sections 182 and 185 to change the threshold value.

For example, in the state of not easily causing the off-track write due to the stick-slip, the writing is permitted when the head position is located in the range of ±40 nm from the center of the track. In this case, the position error signal is set with the threshold value to prohibit the writing when the distance between the head and the center of the track exceeds ±40 nm. On the other hand, in the state of easily causing the off-track write due to the stick-slip, the range for writing permission by the requirements is changed to be stricter. For example, the range for writing permission is changed to narrow down to ±30 nm from the center of the track, and in accordance therewith, the threshold value of the position error signal is changed.

Some position in the magnetic disk device observed with the stick-slip, or some vibration size of the stick-slip may lead to fluctuations of the position error signal before the VCM voltage shows a change. In consideration thereof, two types of requirements are set, i.e., the writing prohibition requirements for the VCM voltage, and the writing prohibition requirements for the position error signal, so that the writing can be prohibited much sooner even if the position error signal fluctuates before the VCM voltage shows a change. This enables to preclude the off-track write due to the stick-slip with more reliability compared with the case of determining whether or not to prohibit the writing using one type of requirements.

Herein, it is preferable if the temperature sensor 20 detects the temperature of any component that is likely to cause the off-track write in response to the occurrence of the stick-slip, and the temperature of the area around the component. For example, when the stick-slip occurs to any component configuring the actuator mechanism such as the carriage 13 or the VCM 14, this wields a large influence over the fluctuations of the head position. Therefore, it may serve well if the temperature of such a component or the environment temperature around the component is measured.

In the aforementioned specific example, described is the specific example in which the writing prohibition requirements are set to the threshold requirements against the fluctuations of the VCM voltage or the fluctuations of the position error signal, and these determination threshold values are changed. Alternatively, as described in the foregoing, any other writing prohibition requirements can be used, e.g., the amount of current fluctuations of the VCM 14, the amount of fluctuations of the acceleration to be detected by the shock sensor 22, and others. In short, the magnetic disk device of the present embodiment is provided with the detection means for directly or indirectly detecting the size of vibration causing the head 11 to fluctuate in position, the means for prohibiting the writing to a magnetic disk by making a threshold value determination against the size of vibration detected by the detection means, and the means for changing the threshold value at the time of the threshold value determination based on the internal temperature of the magnetic disk device and the amount of the temperature change.

For example, if the throughput of the MPU 18 is adequate, the output of the shock sensor 22 may be forwarded to the MPU 18 via the A/D converter, and the threshold determination may be made against any fluctuations of the acceleration detected by the shock sensor 22 if any. By making the threshold value determination against the output signal of the shock sensor 22 that can directly detect the stick-slip vibration, the occurrence of the stick-slip vibration can be detected with much earlier timing compared with the case of monitoring the VCM voltage.

Second Embodiment of the Invention

Figure 12:
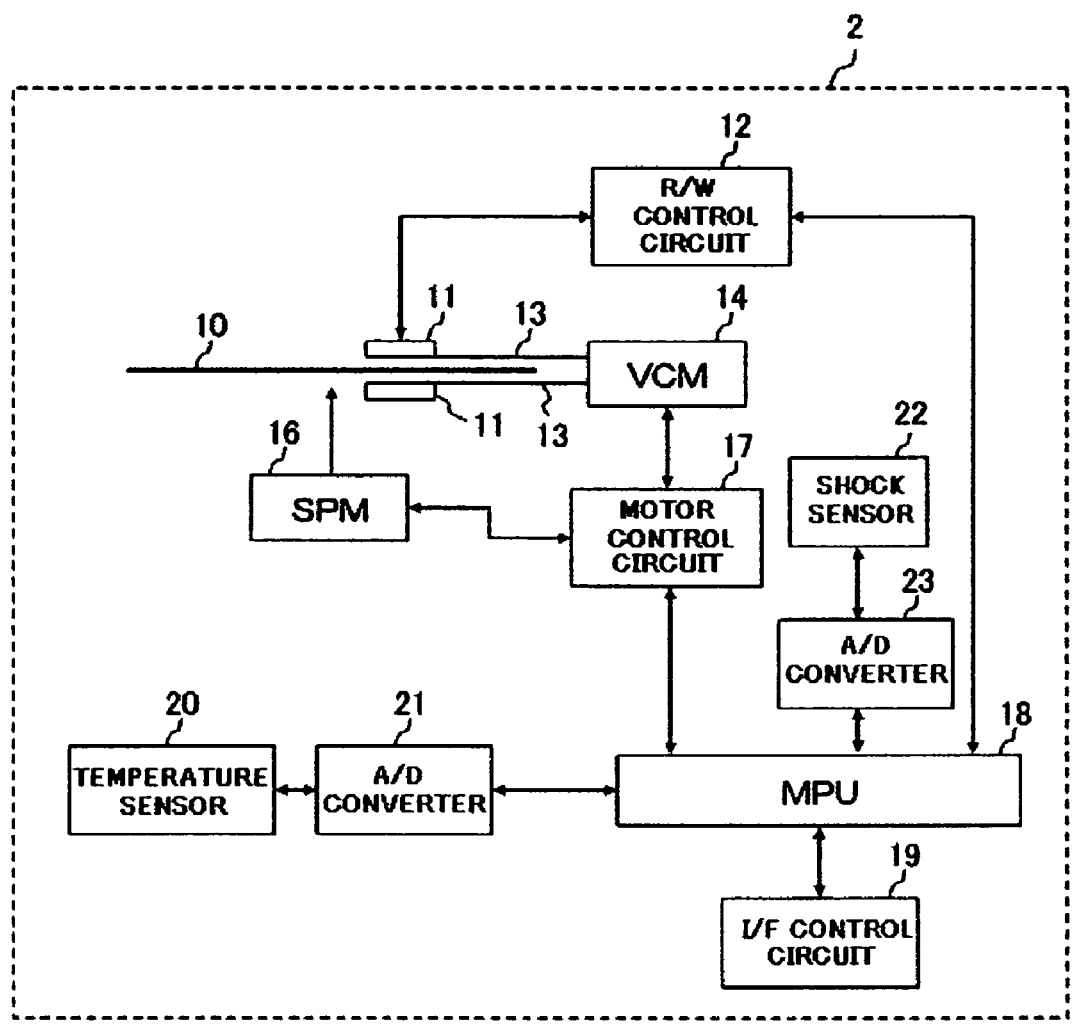
FIG. 12 is a diagram showing the configuration of the magnetic disk device of an embodiment of the present invention.

FIG. 12 shows the configuration of a magnetic disk device 2 of this embodiment. The magnetic disk device 2 is different from the magnetic disk device 1 of the first embodiment of the invention in the respect that the output of the shock sensor 22 is forwarded to the MPU 18 via an A/D converter 23, and the determination requirements are changed for use by the MPU 18 to change the writing prohibition requirements depending on the shock detection result derived by the shock sensor 22. The shock sensor 22 of this embodiment may detect the occurrence of vibration by the VCM voltage or the position error signal (PES).

Figure 13:
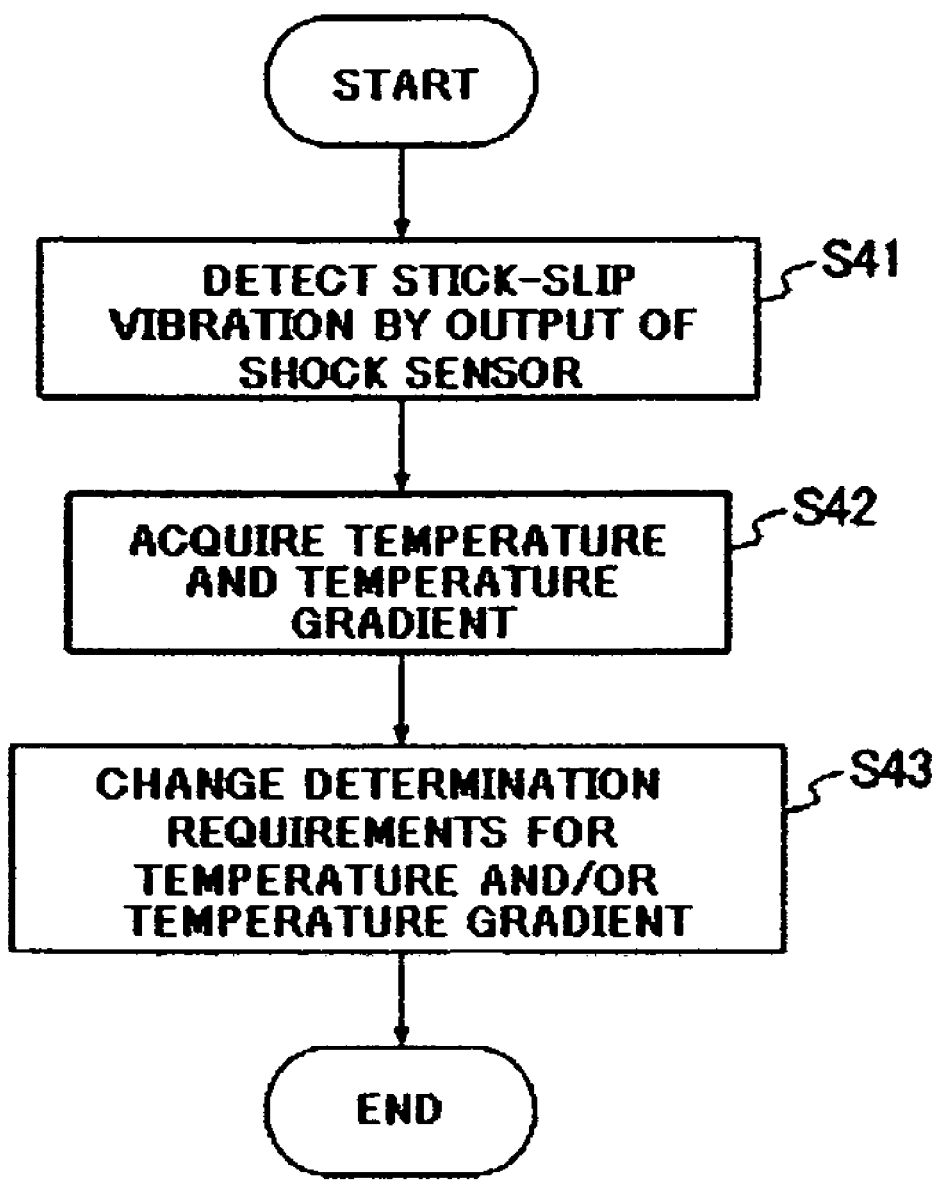
FIG. 13 is a flowchart showing the process of changing determination requirements of an embodiment of the present invention.

By referring to the flowchart of FIG. 13, described is a determination requirements change process to be executed by the MPU 18. In step S41, using the output of the shock sensor 22, the occurrence of the stick-slip vibration is detected. In step S42, the measurement temperature of the temperature sensor 20 is acquired using the vibration detection as a cue, and the temperature gradient is calculated from thus acquired measurement temperature and the past temperature record. The measurement temperature and the temperature gradient are both stored in a RAM (not shown) or others. In step S43, the determination requirements are changed based on the measurement temperature and the temperature gradient stored in step S42. In this manner, when the stick-slip is detected in the region outside of the region applied with the strict writing prohibition requirements, the temperature and the temperature gradient serving as a boundary for change of the writing prohibition requirements are updated by the values stored in step S42. In this manner, the determination requirements can be optimized, and the off-track write can be prevented with more reliability.

Conversely, when the stick-slip is detected only in the narrow region in the region applied with the strict writing prohibition requirements, the temperature and the temperature gradient serving as a boundary for change of the writing prohibition requirements are updated by the values stored in step S42. In this manner, the access capability of the magnetic disk device 2 can be increased.

Any Other Embodiment

In the aforementioned first embodiment, FIG. 7 shows the specific example of the determination requirements at the time when the writing prohibition requirements are changed. However, the determination requirements and the parameters for use for a determination making can be variously modified. The occurrence of the stick-slip due to the thermal distortion is dependent on the temperature at the time of the occurrence and the temperature gradient until the temperature reaches the value. Accordingly, more directly, estimation may be made about the estimation temperature expected to be reached in the future, and the temperature gradient expected to be formed until the temperature reaches the future estimation temperature, and the writing prohibition requirements may be changed based on the resulting values. However, this is not restrictive, and any other parameters similar thereto may be used to indirectly estimate the estimation temperature expected to be reached in the future, and the temperature gradient expected to be formed until the temperature reaches the future estimation temperature. For example, a determination may be made based on the combination of parameters such as (1) the current temperature and the temperature gradient until the current temperature is reached, (2) the current temperature and the temperature gradient expected to be formed in the future, (3) the current temperature and the estimation temperature expected to be reached in the future, and (4) the current temperature, the estimation temperature expected to be reached in the future, and the estimation temperature gradient until the future estimation temperature is reached. Note here that, in order to calculate the future estimation temperature and the future estimation temperature gradient, there needs to use the past record of the temperature including the current temperature acquired by the temperature sensor 20, and the past record of the temperature gradient calculated thereby.

Further, the present invention is not restrictive to the embodiments described above, and it is understood that numerous other modifications can be devised without departing from the scope of the present invention.

What is claimed is:

1. A disk storage device, comprising: a recording disk; a head for making a writing to the recording disk; and a temperature sensor that detects a temperature inside of the device and measures a measurement temperature, wherein
    based on the measurement temperature detected by the temperature sensor and an amount of temperature change calculated using the measurement temperature, a change is made to determination requirements for use to make a determination whether or not to prohibit the head to make the writing to the recording disk; and
    an estimation temperature that is expected to be reached in the future is calculated from the measurement temperature and the amount of temperature change, and the determination requirements are changed when the measurement temperature is higher than a first reference temperature, and when the estimation temperature is higher than a second reference temperature that is higher than the first reference temperature.

2. A control method for the disk storage device according to claim 1, further comprising:
    the estimation temperature that is expected to be reached in the future is calculated from the measurement temperature and the temperature gradient, and the determination requirements—are changed when the measurement temperature is lower than a third reference temperature, and when the estimation temperature is lower than a fourth reference temperature that is lower than the third reference temperature.

3. The disk storage device according to claim 1, wherein
    the determination whether or not to prohibit the writing to the magnetic disk is made by comparison between a threshold value and an amount of measurement having a correlation with position fluctuations of the head, and
    the determination requirements are changed by changing the threshold value.

4. The disk storage device according to claim 1, further comprising:
    a carriage that supports the head;
    a shock sensor that detects a mechanical shock;
    a voice coil motor that is driven by a drive voltage or a drive current reflected with an output of the shock sensor, and puts the carriage in a swinging motion; and
    a detection section that detects the drive voltage or the drive current, wherein
    the determination is made whether or not to prohibit the writing to the magnetic disk depending on whether or not the drive voltage or the drive current detected by the detection section exceeds a threshold value, and
    the determination requirements are changed by changing the threshold value for comparison with the voltage.

5. A disk storage device, comprising:
    a recording disk;
    a head for making a writing to the recording disk;
    a temperature sensor that detects a temperature inside of the device and measures a measurement temperature;
    a determination process section that detects fluctuations of an amount of measurement having a correlation with position fluctuations of the head, and makes a determination whether or not to prohibit the head to make the writing to the recording disk; and
    a requirements change process section that changes the determination requirements for application to the determination process section, wherein
    based on the measurement temperature detected by the temperature sensor and an amount of temperature change calculated using the measurement temperature, the requirements change process section determines whether or not the device is in a temperature area that is likely to cause vibration by thermal distortion, and when determines that the temperature area is likely to cause the vibration by the thermal distortion, the determination requirements are changed for application to the determination process section.

6. The disk storage device according to claim 5, further comprising:
    an estimation temperature calculation section that calculates an estimation temperature that is expected to be reached in the future using the measurement temperature and the amount of temperature change, wherein
    the requirements change process section changes the determination requirements when the measurement temperature is higher than a first reference temperature, and when the estimation temperature is higher than a second reference temperature that is higher than the first reference temperature.

7. The disk storage device according to claim 5, further comprising:
    an estimation temperature calculation section that calculates an estimation temperature that is expected to be reached in the future using the measurement temperature and the amount of temperature change, wherein
    the requirements change process section changes the determination requirements when the measurement temperature is lower than a third reference temperature, and when the estimation temperature is lower than a fourth reference temperature that is lower than the third reference temperature.

8. The disk storage device according to claim 5, wherein the determination process section detects fluctuations of two or more of the amount of measurement, and based on a detection result, makes the determination whether or not to prohibit the head to make the writing to the recording disk.

9. The disk storage device according to claim 5, wherein
    the determination process section makes the determination whether or not to prohibit the writing to the magnetic disk by comparison between a threshold value and an amount of measurement having a correlation with position fluctuations of the head, and
    the requirements change process section changes the determination requirements by changing the threshold value.

10. The disk storage device according to claim 5, comprising:
- a carriage that supports the head; a voice coil motor that puts the carriage in a swinging motion; and a detection section that detects a drive voltage or a drive current of the voice coil motor, wherein
- the determination process section makes the determination whether or not to prohibit the writing to the magnetic disk depending on whether or not the drive voltage or the drive current detected by the detection section exceeds a threshold value, and
- the requirements change process section changes the determination requirements by changing the threshold value for comparison with the voltage.

11. The disk storage device according to claim 5, farther comprising a shock sensor that is capable of detecting vibration caused by thermal distortion, wherein
- the measurement temperature of the temperature sensor is stored when the vibration is detected by the shock sensor, and the stored measurement temperature is used as a basis to change boundary temperature requirements for use to determine whether or not the device is in a temperature area that is likely to cause the vibration by the thermal distortion.

12. A control method for a disk storage device including a recording disk, a head for making a writing to the recording disk, and a temperature sensor that detects a temperature inside of the device and measures a measurement temperature, the method comprising:
- recording the measurement temperature inside the device detected by the temperature sensor;
- calculating an amount of temperature change from a past temperature record using the measurement temperature detected by the temperature sensor,
- based on the measurement temperature and the amount of temperature change, changing determination requirements for use to make a determination whether or not to prohibit the head to make the writing to the recording disk;
- calculating from the measurement temperature and the temperature gradient an estimation temperature that is expected to be reached in the future, and
- changing the determination requirements when the measurement temperature is lower than a third reference temperature, and when the estimation temperature is lower than a fourth reference temperature that is lower than the third reference temperature.

13. The control method for the disk storage device according to claim 12, further comprising:
- calculating from the measurement temperature and the amount of temperature change an estimation temperature that is expected to be reached in the future, and
- changing the determination requirements are changed when the measurement temperature is higher than a first reference temperature, and when the estimation temperature is higher than a second reference temperature that is higher than the first reference temperature.

14. The control method for the disk storage device according to claim 12, wherein
- the determination requirements are changed when the measurement temperature is higher than a reference temperature, when the amount of temperature change is positive, and when an absolute value of the amount of temperature change is larger than a reference amount.

15. The control method for the disk storage device according to claim 12, wherein
- the determination requirements are changed when the measurement temperature is lower than a reference temperature, when the amount of temperature change is negative, and when an absolute value of the amount of temperature change is larger than a reference amount.

16. The control method for the disk storage device according to claim 12, wherein
- the determination whether or not to prohibit the writing to the magnetic disk is made by comparison between a threshold value and an amount of measurement having a correlation with position fluctuations of the head, and
- the determination requirements are changed by changing the threshold value.

17. The control method for the disk storage device according to claim 12, wherein
- the determination whether or not to prohibit the writing to the magnetic disk is made depending on whether a threshold value is exceeded by a drive voltage or a drive current of a voice coil motor that puts, in a swinging motion, the carriage supporting the head, and
- the determination requirements are changed by changing the threshold value for comparison with the drive voltage or the drive current.

* * * * *